April 22, 1924.
E. B. KILLEN
RUBBER BAND TIRE AND ITS ATTACHMENT TO WHEELS
Filed May 11, 1920   2 Sheets-Sheet 1
1,491,537
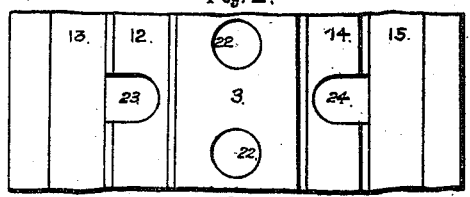
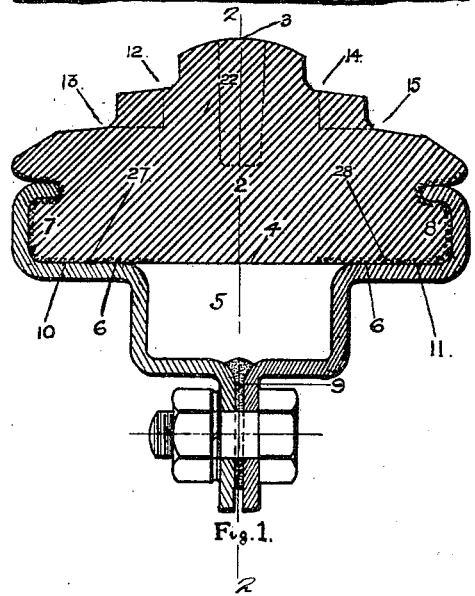
Inventor
Edward Brice Killen
By B. Singer Atty

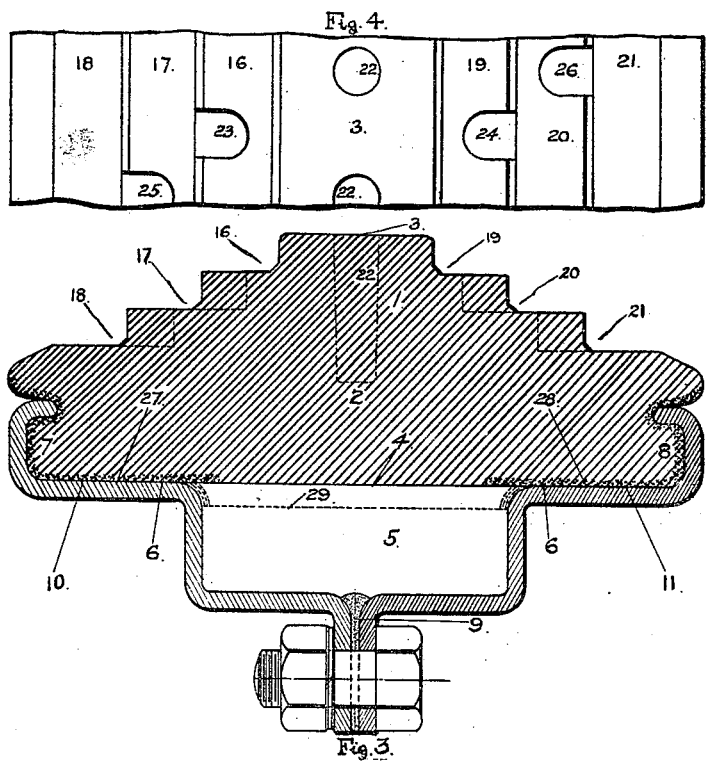

Patented Apr. 22, 1924.

1,491,537

UNITED STATES PATENT OFFICE.

EDWARD BRICE KILLEN, OF LONDON, ENGLAND.

RUBBER BAND TIRE AND ITS ATTACHMENT TO WHEELS.

Application filed May 11, 1920. Serial No. 380,647.

(GRANTED UNDER THE PROVISIONS OF THE ACT OF MARCH 3, 1921, 41 STAT. L., 1313.)

*To all whom it may concern:*

Be it known that I, EDWARD BRICE KILLEN, of 27 Queen Victoria Street, London, E. C. 4, England, have invented certain new and useful Improvements in or Relating to Rubber Band Tires and Their Attachment to Wheels (for which I filed an application in Great Britain May 5, 1919, Serial No. 11,220), of which the following is a specification.

This invention relates to a type of solid rubber band tire which has abnormal shock absorbing qualities and which becomes narrow or wide in effect when in road contact according to the load carried or shock received. It is constructed with a tread which in cross-section is of gable like shape, or of such like effective construction which enables an abnormally supple shock absorbing apex or extreme treading circumference to be obtained in the tire under all working conditions. The tire is also constructed with a free flexible inner base part formed within the supple apex and between the inextensible base foundations of the tire which in cross-section are flat and are securely attached to a suitable wheel having a continuous air space or chamber formed centrally on the wheel's outer bed circumference, all as hereinafter described with reference to the drawings and pointed out in the claims.

In order that my invention may be properly understood and readily carried into effect, I have hereunto appended two sheets of drawings, of which—

Figure 1 shows a cross-section of my type of solid rubber band tire fitted to a wheel's circumference having a supple gable-like tread with an abnormal shock absorbing apex and tire center line and a grooveless flexible base part, formed between right and left inextensible base foundations.

Figure 2 is a plan of the supple gable-like tread of the tire with its abnormally resilient apex or extreme circumference as shown in Figure 1.

Figure 3 shows a modified form of the tire as shown in Figure 1.

Figure 4 is a plan of the supple gable-like tread of the tire having an abnormally shock absorbing apex and tire center line as shown in Figure 3.

The gable-like tread 1 of the tire becomes more or less flat in cross-section with increase of load, by the rubber in the tire being suitably hinged or bent back on and about the tire's central line 2, as the tread 1 comes into road contact. The tire must be constructed of such a shape that when its supple apex or extreme circumference 3 comes into road contact, the rubber 4 in the tire within the apex is hinged or bent back into a continuous air chamber or air space 5 formed on the outer metal bed circumference 6 of the wheel thereby enabling a great circumferential contact or flat to be obtained in this type of rubber band tire under both light and heavy loads. This construction and combination of a solid rubber band type of tire and wheel gives abnormal resiliency (shock absorbing qualities) to the tire under all working conditions.

In this invention the tire may be attached to a suitable divisible wheel constructed from dishlike plates, having a metal bed circumference part 6 which is flat in cross-section and hooking flanges at each right and left edge of the bed circumference. The right and left base parts of the tire 7 and 8 are then easily clamped and keyed to correct position to and over the suitable metal bed circumference of the wheel by say bringing the right and left main stampings of the divisible wheel together back to back and then bolting them securely together, having when required a suitable airtight flexible band 9 lying between the metal stampings to enable the air chamber 5 between the tire and its wheel to become an airtight chamber. The continuous air space or chamber 5 if formed on the wheel's outer metal bed circumference 6 is constructed so that the rubber on and about the tire's centre line 2 is capable of being hinged or bent back into the air space or chamber 5 to a greater or less extent, according to the load carried or shock received.

In this invention, I do not confine the attachment of the solid rubber band tire to a divisible wheel only, as any suitable wheel may be used, provided the wheel has a suitable continuous confined air chamber or space 5 formed on its bed circumference into which the rubber 4 in the base of the tire can flow or be spewed under load, so that the tire when in road contact in cross-section is capable of becoming effectively wide under heavy loads and effectively narrow under light loads as and when required, by the rubber being suitably displaced on its inner circumference 4, and the hinging or bending back of the rubber on and at each side of the tire's centre line 2, gives abnormal resiliency or shock absorbing qualities to the tire when in road contact, without the rubber in the tire being disintegrated or injured during the tire's life, and without interfering with the airtight mechanical attachment of the tire to its wheel.

It is to be noted that under load the rubber on the tire's extreme outer circumference 3, see Figures 1, 2, 3 and 4, is put under compression and at the same time the rubber which is free to spew on the tire's inner circumference 4 is put under stretch thereby causing a new technical effect to be obtained in solid rubber band tires. By means of this invention this type of solid rubber band tire may be manufactured with abnormal resiliency to carry heavy chassis up to say 10 to 12 tons without the risk of the tire collapsing during its life. The air space or chamber 5 constructed on the bed circumference of a suitable wheel is preferably formed into an airtight chamber when the tire is mechanically fitted to its wheel, airtight joints being formed at 10 and 11 between the base of the tire and the bed circumference of the wheel and also say at 9 between the wheel's metal flanges, and if required air at varying pressures may be used within the airtight chamber 5 with or without the use of a suitable air tube to give extra speed of recovery or frequency of repose to the apex 3 and gable-like tread 1 of the tire. The gable-like tread 1 is preferably manufactured with suitable endless grooves 12, 13, 14, 15 as shown in Figure 1 and 16, 17, 18, 19, 20, 21 as shown on Figure 3 and I preferably form a row of holes 22 with a depth of about 2 inches, on the centre line of the tire, see Figures 1, 2, 3 and 4, and in addition to the endless grooves and deep holes referred to above, I may also form suitable cavities 23, 24 and 25 and 26, at each side of the tire's apex 3 at the bottom of the endless grooves see Figures 1, 2, 3 and 4. This construction gives to the tire a non-skidding non-slipping tread which remains effective during the life of the tire.

The tire is preferably always fitted to its wheel so that the endless air space 5 remains an airtight chamber during the life of the tire under all working conditions, and the inner base part of each tire at each side 27 and 28, is preferably manufactured to be practically unstretchable and flat in cross-section.

It is to be specially noted that this type of solid rubber band tire when attached to its wheel is sensitive under light loads and increases in effective strength with increase of load, by bringing more inches of tire wall circumferentially into road contact to carry the extra load as and when required, and that abnormally heavy loads may be carried on these resilient tires, and objectionable road obstacles absorbed by means of the suppleness and elasticity of the tread 1 under both light and heavy loads, a thing impossible with existing types of solid rubber band tires the centre line of which tires can only give in road contact about $\frac{1}{16}$th to an $\frac{1}{8}$th of an inch under maximum loads and have practically no resiliency under light loads, because of the fact that rubber is, like water, practically incompressible.

The base part of the tire may be manufactured flat in cross-section as shown in Figures 1 and 3 but under certain conditions the central spewable part of the base, which is free to flow inwards, may extend slightly into the airchamber as shown in dotted line 29 in Figure 3, but under all conditions the centre line and adjacent rubber in this tire must have abnormal resiliency as compared with the centre line and adjacent rubber of existing solid rubber band tires.

This tire may be constructed in all suitable dimensions and of suitable materials, and in constructing the right and left practically unstretchable flat in cross-section base parts 7 and 8 of the tire, canvas, or woven cord, or metal, or any suitable materials, may be used in the tire's manufacture to enable the base of the tire to be airtightly fitted and securely held and clamped to the wheel under compression provided the materials used in the unstretchable right and left base parts do not interfere with the efficient hinging or bending back of the rubber in the flexible base of the tire on or about its centre line, as and when required.

Claims.

1. A solid rubber band tire characterized by having in cross section a gable like tread which is the widest part of the tire, and an abnormally flexible apex and tire center line having right and left treading buffers which come into road contact when the tire is overloaded, a row of holes being formed on the tire's center-line and treading apex, with grooves and cavities formed on its gable-like treading sides, substantially as described.

2. A solid rubber band tire characterized by having in cross section a gable like tread which is the widest part of the tire, and an abnormally flexible apex, having right and left treading buffers which come into road contact when the tire is overloaded, and with right and left base foundations which are flat in cross section, capable of being mechanically and air-tightly attached to a wheel having an endless air space formed on its outer circumference into which the rubber on and about the tire's center line flows when under load, constructed and operating substantially as described.

3. A solid rubber band tire characterized by having in cross section a gable-like tread with extreme right and left treading buffers or ribs which are the widest part of the tire, and an abnormally flexible apex and rubber hinging center line which is the thickest part of the tire's cross section, the tread being narrow in effect when carrying a light load and wide and strong in effect when carrying a heavy load, substantially as described.

4. A solid rubber band tire characterized by having in cross section a gable-like tread which is the widest part of the tire, and an abnormally flexible apex and rubber hinging center line which is the thickest part of the tire's cross section and having right and left treading buffers which come into road contact when the tire is overloaded; non-skid treading grooves and cavities formed on its gable-like treading sides, substantially as described.

5. A solid rubber band tire characterized by having in cross section a gable-like tread which is the widest part of the tire, and an abnormally flexible apex and rubber hinging center line which is the thickest part of the tire's cross section and having right and left treading buffers which come into road contact when the tire is overloaded, and with right and left base foundations constructed flat in cross-section hookable and inextensible, substantially as described.

6. A solid rubber band tire characterized by having in cross section a gable-like tread which is the widest part of the tire, and an abnormally flexible apex, having right and left treading buffers which come into road contact when the tire is overloaded and also protect the metal tire retaining hooking flanges, and with right and left base foundations which are flat in cross section, capable of being mechanically and air-tightly attached to a wheel having an endless air space formed on its outer circumference and a hinging center line so that the rubber on and about the said center line flows into said air space when under load, constructed and operating substantially as described.

In testimony whereof I affix my signature in presence of two witnesses.

EDWARD BRICE KILLEN.

Witnesses:
   JOHN LIDDLE,
   JOHN TRAIN LIDDLE.